(12) United States Patent
Sartor et al.

(10) Patent No.: US 9,693,010 B2
(45) Date of Patent: Jun. 27, 2017

(54) METHOD, ELECTRONIC DEVICE, AND SERVER FOR GENERATING DIGITALLY PROCESSED PICTURES

(71) Applicant: Sony Corporation, Minato-ku (JP)

(72) Inventors: Piergiorgio Sartor, Fellbach (DE); Klaus Zimmermann, Neckartenzlingen (DE)

(73) Assignee: SONY CORPORATION, Tokyo (JP)

( * ) Notice: Subject to any disclaimer, the term of this patent is extended or adjusted under 35 U.S.C. 154(b) by 176 days.

(21) Appl. No.: 14/588,497

(22) Filed: Jan. 2, 2015

(65) Prior Publication Data

US 2015/0264246 A1    Sep. 17, 2015

(30) Foreign Application Priority Data

Mar. 11, 2014    (EP) .................................... 14158927

(51) Int. Cl.
*H04N 5/228*    (2006.01)
*H04N 5/225*    (2006.01)
*H04N 5/232*    (2006.01)
*H04N 5/77*    (2006.01)
*H04N 9/82*    (2006.01)

(52) U.S. Cl.
CPC ............ *H04N 5/77* (2013.01); *H04N 9/8205* (2013.01)

(58) Field of Classification Search
CPC .................. H04N 5/77; H04N 9/8205; H04N 2005/4405; H04N 2005/4407; H04N 2005/4423; H04N 21/42204; H04N 21/42207; H04N 21/42219; H04N 21/42222; H04N 21/60; H04N 7/18; H04N 7/181; B25J 19/02; B25J 19/023; G06K 9/00335

See application file for complete search history.

(56) References Cited

U.S. PATENT DOCUMENTS

| | | | | |
|---|---|---|---|---|
| 6,535,243 | B1 | 3/2003 | Tullis | |
| 7,778,438 | B2* | 8/2010 | Malone | G06F 17/30038 382/100 |
| 8,040,384 | B2* | 10/2011 | Mayuzumi | H04N 1/00127 348/207.1 |
| 8,310,556 | B2 | 11/2012 | Georgis et al. | |
| 8,477,203 | B2* | 7/2013 | Ito | H04N 1/00127 348/207.2 |
| 2002/0167595 | A1* | 11/2002 | Patel | G06F 1/1626 348/211.3 |
| 2004/0135900 | A1* | 7/2004 | Pyle | H04N 1/00912 348/231.3 |
| 2005/0146621 | A1* | 7/2005 | Tanaka | H04N 1/00127 348/211.2 |
| 2009/0184849 | A1* | 7/2009 | Nasiri | A63F 13/211 341/20 |
| 2012/0249554 | A1 | 10/2012 | Chen et al. | |

(Continued)

*Primary Examiner* — Trung Diep
(74) *Attorney, Agent, or Firm* — Oblon, McClelland, Maier & Neustadt, L.L.P.

(57) ABSTRACT

A method for generating a digitally processed picture includes receiving, from an electronic device, raw image data generated by an image sensor of the electronic device and auxiliary sensor data produced by an auxiliary sensor at the electronic device. The method further includes processing the raw image data to generate a digitally processed picture taking into account the auxiliary sensor data.

20 Claims, 4 Drawing Sheets

(56) References Cited

U.S. PATENT DOCUMENTS

| | | | |
|---|---|---|---|
| 2013/0100313 A1* | 4/2013 | Doida | H04N 9/73 348/223.1 |
| 2013/0317659 A1* | 11/2013 | Thomas | H04W 52/0216 700/286 |
| 2014/0156735 A1* | 6/2014 | Yamasaki | H04L 69/28 709/203 |
| 2014/0211031 A1* | 7/2014 | Han | H04N 5/23222 348/208.99 |
| 2014/0270688 A1* | 9/2014 | Han | H04N 5/772 386/225 |
| 2014/0270689 A1* | 9/2014 | Chau | H04N 5/23245 386/227 |
| 2014/0320679 A1* | 10/2014 | Lammers | G03B 17/38 348/208.2 |
| 2014/0320687 A1* | 10/2014 | Chau | G06F 3/011 348/222.1 |
| 2014/0320697 A1* | 10/2014 | Lammers | H04N 1/00198 348/231.99 |
| 2014/0333828 A1* | 11/2014 | Han | H04N 5/225 348/373 |
| 2014/0340533 A1* | 11/2014 | Matheson | H04N 5/232 348/207.1 |
| 2014/0354880 A1* | 12/2014 | Han | H04N 5/2252 348/376 |
| 2016/0164873 A1* | 6/2016 | Das | G06F 17/30896 707/784 |

* cited by examiner

METHOD, ELECTRONIC DEVICE, AND SERVER FOR GENERATING DIGITALLY PROCESSED PICTURES

TECHNICAL FIELD

The present disclosure generally pertains to methods, electronic devices, and servers for generating digitally processed pictures. The electronic devices may be for example hand-held cameras, digital single-lens reflex (DSLR) cameras or smart phones. The server may be part of a server system in the Internet which provides a cloud service.

TECHNICAL BACKGROUND

Digital photography and digital videography generally consists of following elementary components: optics, image sensor and signal processing. The optical system focuses incoming light onto an electronic image sensor. The image sensor converts impinging light for causing measurable electrical effects. The measurable electrical effects are sampled by an analog-to-digital converter. The signal processing component reconstructs an image by converting and processing data acquired by the image sensor and converted to a digital representation into a viewable format. The reconstruction step typically includes the processing steps of demosaicing or debayering, converting the sensor data into a RGB format which can be displayed by a monitor. Subsequent processing steps may comprise gamma correction, chroma subsampling, denoising, and JPEG encoding. The resulting image is typically stored on a recording medium such as a flash memory, an optical disc, or a hard drive.

Over the years additional sensors besides the image sensor have been integrated into electronic devices and into cameras starting with an autofocus sensor (AF sensor). Such additional sensors (for example gyro sensor, accelerometer, GPS receiver, temperature sensor) are either directly used in the image processing step, or their data are passed along with the image data as meta data for allowing more functions on the user side such as location tracking by GPS, GLONASS, and Galileo.

The quality of the stored image depends on quality of the individual components. Recently, a trend called 'computational photography (CP)' has introduced a new design paradigm according to which the core components (optics, sensor, signal processing) are co-designed for allowing a compensation of deficiencies of optics and sensors by computations.

SUMMARY

According to one aspect the disclosure provides a method comprising: receiving, from an electronic device, raw image data generated by an image sensor of the electronic device, and auxiliary sensor data produced by an auxiliary sensor at the electronic device; and processing said raw image data to generate a digitally processed picture taking into account said auxiliary sensor data.

According to a further aspect the disclosure provides an electronic device comprising: an image sensor for sensing an image and for generating raw image data representing said image; an auxiliary sensor for acquiring auxiliary sensor data; and a transmitter for transferring said raw image data and said auxiliary sensor data to a remote image processing server, wherein said remote image processing server is configured to process said raw image data to generate a digitally processed picture taking into account said auxiliary sensor data.

According to a further aspect the disclosure provides a server comprising a processor which is configured to receive raw image data; receive auxiliary sensor data; and process said raw image data to generate a digitally processed picture taking into account said auxiliary sensor data.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
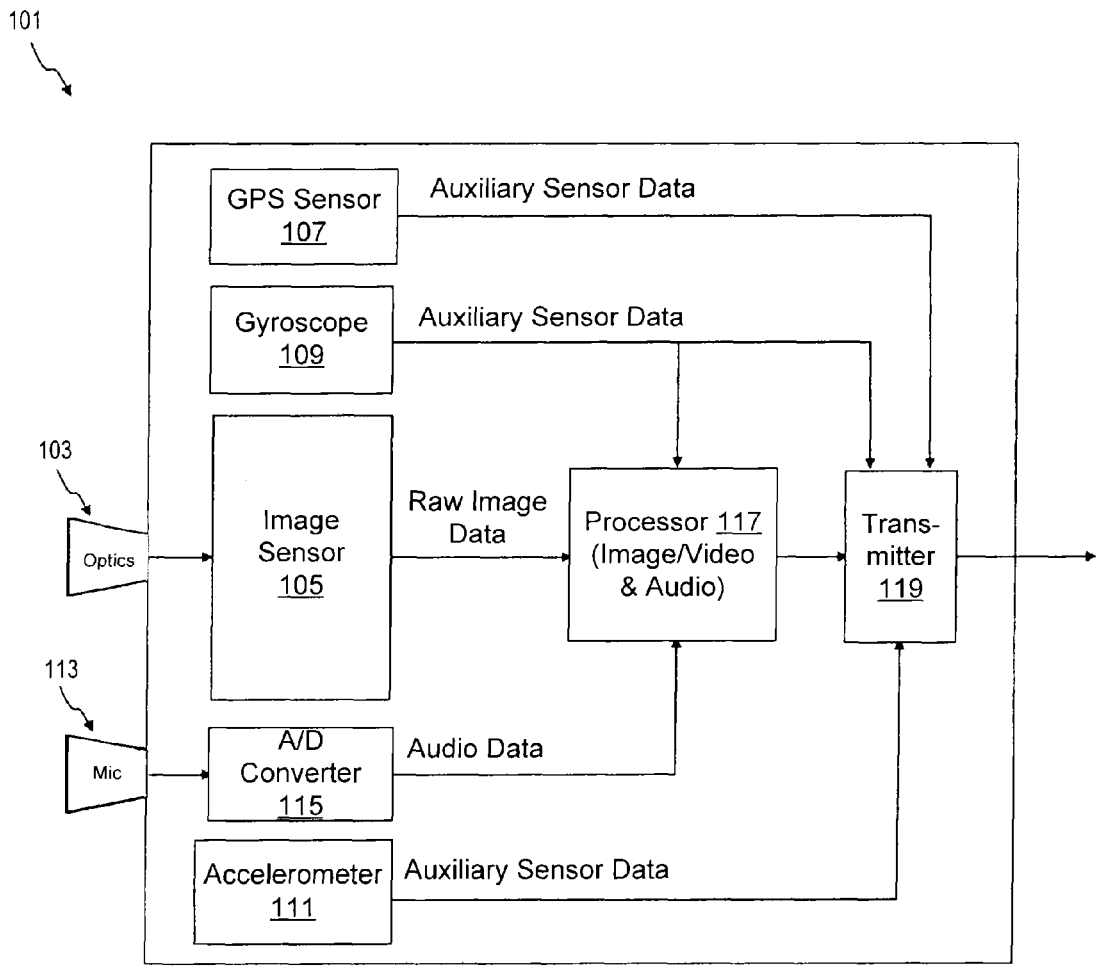
FIG. 1 illustrates schematically an embodiment of an electronic device, here a digital camera.

Examples of embodiments of electronic devices, cloud services, servers, and methods for generating digitally processed pictures are now described.

A method for generating digitally processed pictures may comprise receiving, from an electronic device, raw image data generated by an image sensor of the electronic device, and auxiliary sensor data produced by an auxiliary sensor at the electronic device; and processing said raw image data to generate a digitally processed picture taking into account said auxiliary sensor data.

The electronic device may for example be any device that comprises an image sensor, such as a digital camera, in particular a digital pocket camera, a digital single-lens reflex camera (DSLR), or a smart phone with integrated camera.

The receiving raw image data and auxiliary sensor data and the processing said raw image data to generate a digitally processed picture may be performed by a remote image processing server.

The method may further comprise: generating, by said electronic device, raw image data using an image sensor; acquiring, by said electronic device, auxiliary sensor data from an auxiliary sensor; and transferring, by said electronic device, said raw image data and said auxiliary sensor data to the remote image processing server.

Raw image data typically contains non-processed or minimally processed data from the image sensor. Minimal processing may for example comprise including sensor metadata which is used for interpreting the raw sensor signals, including for example the size of the sensor and attributes of the color filter array and its color profile. Some raw image data contain a standardized metadata section with data in Exif format. Also, raw image data may be, for compression purpose, encoded data.

Raw image data typically needs some further processing by a so-called raw converter in order to obtain a digitally processed picture which can be viewed on a display device. The term digitally processed picture is used in the following to delimit digitally processed image data from raw image data. For example, in order to obtain a digitally processed picture, raw image data may be converted into a wide-gamut colorspace where precise adjustments can be made before conversion to a file format for digitally processed pictures such as TIFF or JPEG. Further processing may include encoding the digitally processed picture in a device-dependent colorspace. When converting raw image data to a standardized, ready-to-be-used format for digitally processed pictures, a number of operations may be performed. Such operations may include at least one of preprocessing (including demosaicing or debayering), gamma correction, color space conversion, YUV space processing, and image compression.

In the embodiments described below in more detail, the processing of raw image data to generate a digitally processed picture takes into account auxiliary sensor data.

Auxiliary sensor data may comprise at least one of audio data, electronic device settings, operational electronic device data, user data, positional data, movement data, temperature data, meteorological data, and radio data.

The method may further comprise transmitting, by said remote image processing server, said digitally processed picture to the electronic device. In alternative embodiments, the digitally processed picture is transmitted to a playback device which is different from the electronic device which generated the raw image data.

Processing said raw image data to generate a digitally processed picture may comprise a device-type-dependent processing of raw image data, an accelerometer-based processing of raw image data, a location-based processing of raw image data, a temperature-dependent processing of raw image data, or a device-setting-dependent processing of raw image data.

It is also disclosed a server comprising a processor which is configured to receive raw image data, receive auxiliary sensor data, and process said raw image data to generate a digitally processed picture taking into account said auxiliary sensor data. The processor may be a single processor or a distributed processor that comprises multiple processing units which are located at different places.

A cloud server system which provides a cloud service for processing raw image data may comprise one or more image processing servers as described above.

Embodiments of electronic devices, cloud services, servers, and methods for generating digitally processed pictures are now described in more detail with reference to the drawings.

FIG. 1 shows schematically a block diagram of an electronic device 101. The electronic device 101 has optics 103, an image sensor 105, a GPS receiver 107, a gyroscope 109, an accelerometer 111, a microphone 113, an analog-to-digital converter 115 for audio signals, an internal processor 117, and a transmitter 119. The transmitter 119 is arranged for transmitting raw image data to a remote image processing server configured for converting raw image data generated by image sensor 105 to a digitally processed picture. Sensors 107, 109, 111 produce auxiliary sensor data which is also transmitted to the remote image processing server by transmitter 119. The remote image processing server may be part of a cloud system which provides a cloud service for image processing.

Figure 2:
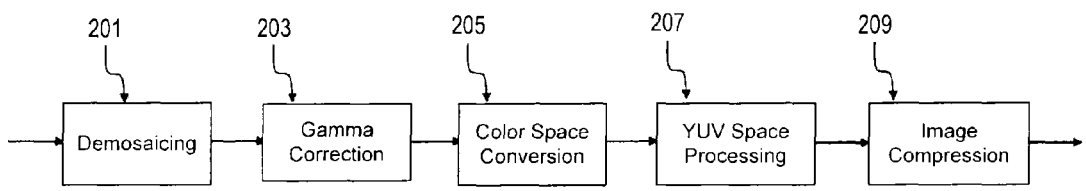
FIG. 2 illustrates schematically an example sequence of operations performed when processing raw image data to generate a digitally processed picture.

FIG. 2 shows an embodiment of a processing which is done by a raw converter located at a remote image processing server to obtain a digitally processed picture from raw image data received from an electronic device such as that described with reference to FIG. 1. In the processing of FIG. 2 a number of operations are performed. These operations include demosaicing 201 (or debayering), gamma correction 203, color space conversion 205, YUV space processing 207, and image compression 209.

In alternative embodiments, processing of raw image data may also include noise reduction, tone mapping, chroma subsampling, white balancing, etc.

In the embodiment of FIG. 2, exemplifying preprocessing operations are listed in a sequence in which they are usually performed. This sequence is, however, not binding and may be altered in alternative embodiments. Further, depending on the requirements of a specific image sensor, any subset of the listed operations may be omitted from the sequence of operations.

According to the embodiments described here, the conversion of raw image data received from an electronic device is processed by a remote image processing server. In other words, all or at least one of said steps of processing of said raw image data are performed by the remote image processing server.

Figure 3:
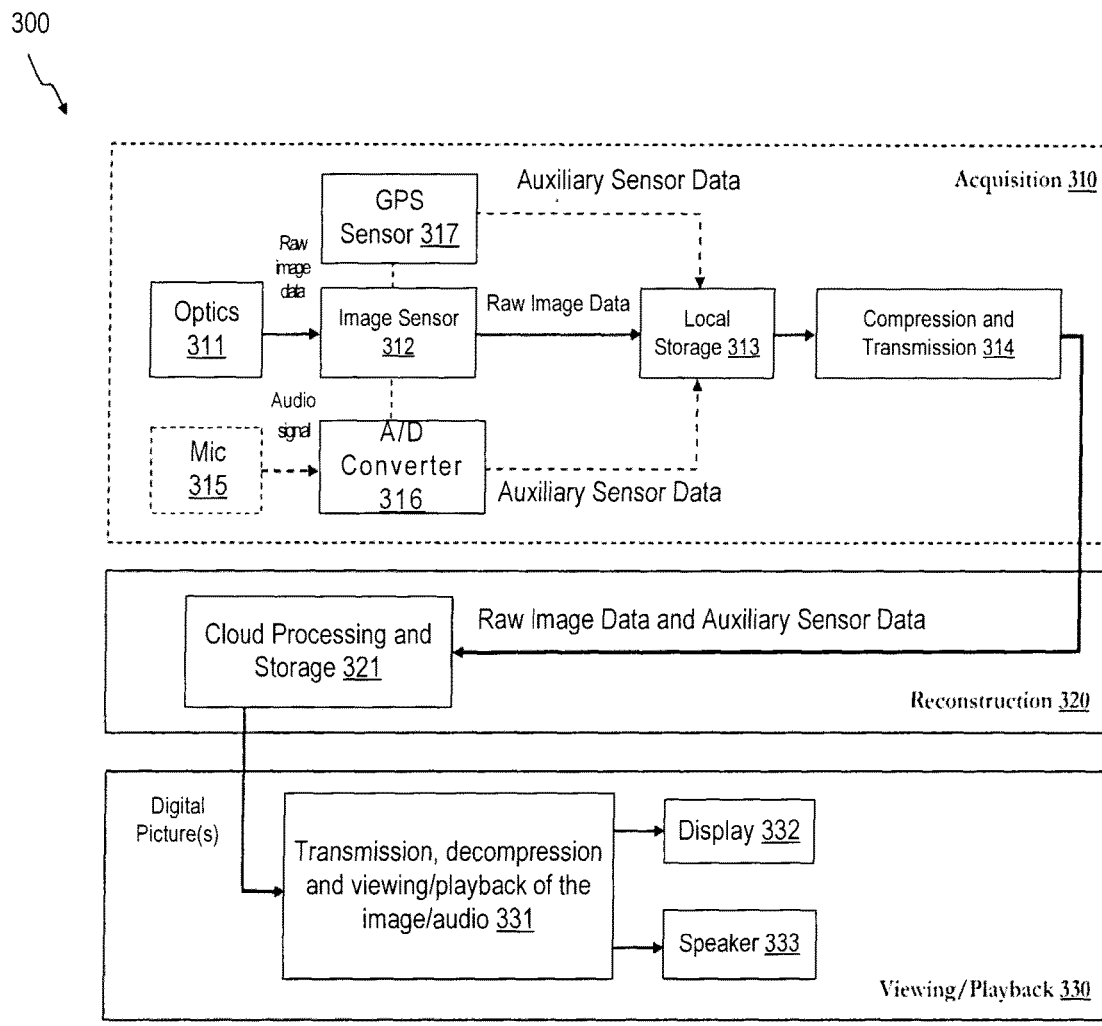
FIG. 3 illustrates schematically a system for generating digitally processed pictures.

FIG. 3 illustrates schematically an embodiment of a system 300 for generating digitally processed pictures. The system 300 comprises an acquisition part 310, a reconstruction part 320, and a viewing/playback part 330. The acquisition part 310 may be an electronic device such as that disclosed in the embodiment of FIG. 1, for example a digital camera. Similar to FIG. 1, the acquisition part 310 of the embodiment of FIG. 3 is an electronic device which comprises optics 311, an image sensor 312, and a compression and transmission unit 314. Further, the acquisition part 310 of FIG. 3 also comprises a local storage 313. The optics 311 is configured to form an image of an object onto image sensor 312. The image sensor 312 is configured to generate raw image data of an image received by the image sensor 312. The image sensor 312 is configured to send raw image data to the local storage 313 where it is temporally stored. In addition, the acquisition part 310 comprises a microphone 315 and an analog-to-digital converter 316. The microphone 315 is configured to generate an audio signal and to provide the audio signal to the analog-to-digital converter 316. The analog-to-digital converter 316 is configured to send audio data (which may also be used as auxiliary sensor data) to the local storage 313. The local storage 313 may be a flash memory, a disk drive, or the like. The local storage 313 is configured to send stored raw image data and stored auxiliary sensor data to the compression and transmission unit 314. In addition, the acquisition part 310 comprises a GPS sensor 317. GPS sensor 317 is configured to obtain and to send GPS data (for use as auxiliary sensor data) to the local storage 313.

The compression and transmission part 314 is configured to transmit raw image data captured by image sensor 312 and auxiliary sensor data to a reconstruction part 320 of system 300. In order to save transmission bandwidth, before transmission of the raw image data to the reconstruction part 320, the compression and transmission part 314 may compress the raw image data.

Figure 4:
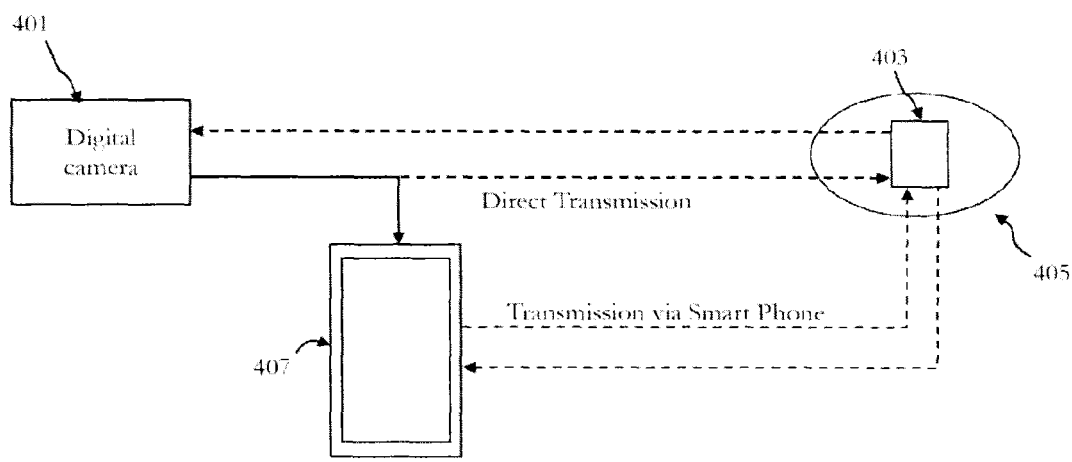
FIG. 4 illustrates schematically two modes of transmitting data from a digital camera to an image processing server for generating digitally processed pictures.

FIG. 4 schematically describes two modes in which the compression and transmission part 314 of the acquisition part 310 may perform the transmission of the data to the reconstruction part 320. In the embodiment of FIG. 4 the acquisition part 310 is formed by a digital camera 401, and the reconstruction part 320 is formed by a cloud server system 405 which comprises an image processing server 403. According to a first mode, the digital camera 401 sends the raw image data directly to the image processing server 403 via a GSM, UMTS, or LTE transmitter (e.g. compression and transmission unit 314 of the electronic device of FIG. 3, or transmitter 19 of the electronic device of FIG. 2) built into the acquisition part of the system. According to a second mode, the digital camera 401 is connected to a smart phone 407 via a cable connection or a WIFI connection. This connection is used to send raw image data and auxiliary sensor data from digital camera 401 to smartphone 407. The smartphone 407 is acting as a gateway between the digital camera 401 and the image processing server 403. The smartphone forwards the raw image data and auxiliary data received from digital camera 401 to the cloud service 405.

Returning to the embodiment of FIG. 3. The reconstruction part 320 of system 300 may be an image processing server that is located in the cloud. The reconstruction part 320 may thus be located at a location remote to acquisition part 310, for example at a central office of a service provider. The reconstruction part 320 may be realized as a cloud service. That is, multiple image processing servers may perform the functionality of the reconstruction part 320 in a distributed manner.

The reconstruction part 320 comprises a cloud processing and storage unit 321 which is configured to process raw image data received from acquisition part 310 in order to convert the raw image data to a digitally processed picture. When performing the processing of the raw image data, the reconstruction part 320 takes into account auxiliary sensor data received from the acquisition part 310, as it is described in more detail in the embodiments presented below. The reconstruction part 320 is configured to send digitally processed pictures obtained by processing the raw image data to a viewing/playback part 330 of system 300.

The viewing/playback part 330 comprises a transmission, decompression and viewing unit 331 for displaying or playing back digitally processed pictures and audio information. The viewing/playback part 330 employs a display 332 for displaying the reconstructed digitally processed picture. The viewing/playback part 330 further comprises a speaker 333 for outputting audio information.

Typically, the acquisition part 310 and the viewing/playback part 330 are formed by the same electronic device, e.g. a digital camera as shown in the embodiment of FIG. 2. However, the acquisition part 310 and the viewing/playback part 330 must not necessarily be located in the same electronic device. For example, a display (or a view finder) for a digital camera which acts as acquisition part 310 might be realized through a smart phone or a notebook.

As the processing of the raw image data is performed by the reconstruction part 320, less or even no processing of the raw image data needs not be performed by the acquisition part 310, i.e. by an electronic device such as a digital camera. Hence, the processing power of the acquisition part 310 can be reduced to a minimum.

The reconstruction part 320 may for example perform the operations described in the embodiment of FIG. 2. Thus, in this embodiment, the acquisition part 310 can be relieved from the burden of performing preprocessing steps of the raw image data conversion. This allows for a more efficient design of the electronic device that forms the acquisition part 310. For example, for the acquisition part 310 a more cost-efficient internal processor can be applied. This allows for less complex and lower cost electronic devices to be used as acquisition part 310.

The processing at the reconstruction part 320 may also comprise operations such as generating greater pixel density, adjusting color balance, adjusting contrast, adjusting gamma, adjusting luminance, filtering device limiting fixed pattern noise, filtering noise using a Wiener filter, changing zoom factors, recropping, applying enhancement filters, applying smoothing filters, applying subject-dependent filters, applying coordinate transformations, morphing, distortion, changes in perspective, artistic enhancements, and improving captured image data beyond practical capabilities of a hand-held electronic device (for example a held-held digital camera).

Other image processing functions may be executed by the reconstruction part 320, such as compressing images, resizing and/or scaling using an interpolation algorithm, executing histogram equalization on images, executing color enhancement algorithms on images, reducing the red eye effect in images of people, executing geometric transformations, deblurring images, filtering noise from images, dynamic range expansion, correction of lens distortion effects, motion compensation to reduce the effect of camera shaking and/or object motion, executing super-resolution enhancement techniques, and stitching together multiple images to produce mosaics and panoramas, transcoding.

The processing made by the reconstruction part 320 may also include audio processing in case the acquisition part of the system is equipped a microphone (315 in FIG. 3).

The processing steps may be performed at a quality level required by a particular application ranging from low to high end. Due to the high available computing power potentially available with image processing servers or cloud services, the raw data processing done by a image processing server or cloud service can be performed better than in a conventional electronic device. For example, the processing of raw image data may be applied to raw image data produced by an acquisition part of a Lightfield camera or a digital camera having a gigapixel image sensor.

Algorithms utilized in processing the raw image data may be upgraded at any time in the future, since the acquired raw image data contains pure sensor data. This allows a cloud image processing service to benefit from the most recent algorithm developments in image processing. In this sense the system 300 of FIG. 3 may be future-upgradeable.

In addition, the complete image generating process may be performed in real-time. Further, the raw image data from the image sensor of the acquisition part 310 may be immediately sent to the reconstruction part 320, or off-line. I.e, the raw image data may be stored in the electronic device and sent later, maybe from home, office, or hotel, to a final image processing stage of the image processing server.

Figure 5A:
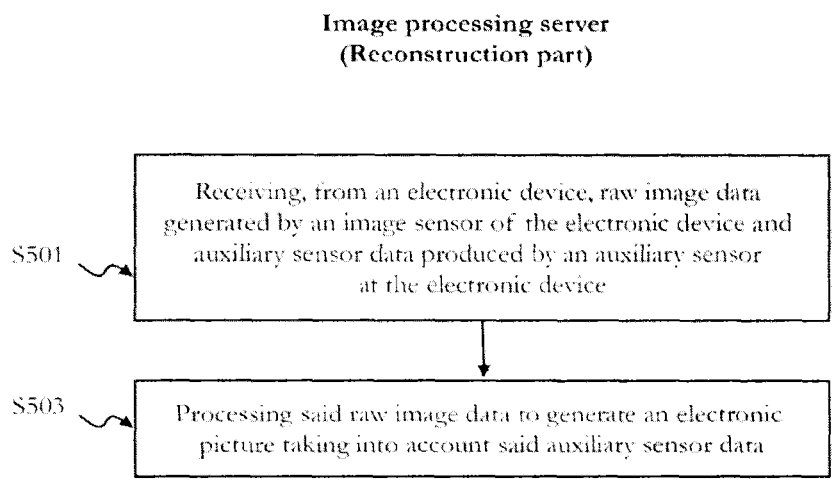
FIGS. 5a and 5b illustrate schematically embodiments of methods for generating digitally processed pictures.
Figure 5B:
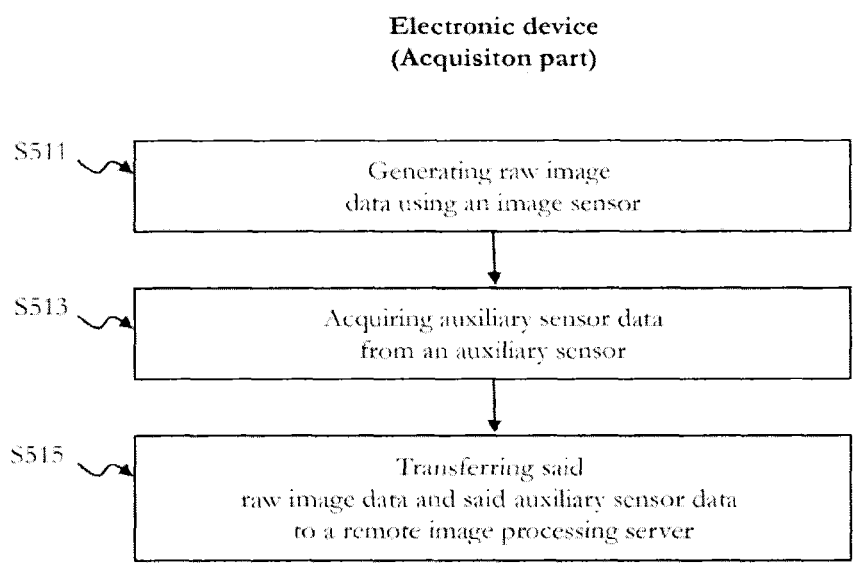

FIGS. 5*a* and 5*b* show embodiments of methods for generating digitally processed pictures.

FIG. 5*a* describes an embodiment of operations that are performed by an image processing server which may form the reconstruction part 320 of FIG. 3. At S501 raw image data generated by an image sensor of the electronic device and auxiliary sensor data produced by an auxiliary sensor at the electronic device is received from an electronic device. At S503, the raw image data is processed to generate a digitally processed picture taking into account said auxiliary sensor data.

FIG. 5*b* describes an embodiment of operations that are performed by an electronic device which may form the acquisition part 310 of FIG. 3. At S511, the electronic device generates raw image data using an image sensor. At S513, auxiliary sensor data is acquired from an auxiliary sensor. At S515, the raw image data and the auxiliary sensor data are transferred to a remote image processing server.

In the following, embodiments are described in more detail, in which the processing, by an image processing server which acts as a reconstruction part (320 in FIG. 3), of raw image data to generate a digitally processed picture takes into account auxiliary sensor data received from an electronic device which acts as an acquisition part (310 of FIG. 3).

Device-type-dependent Processing of Raw Image Data

Digital cameras such as pocket cameras or DSLRs comprise sensors which determine the type of lens used in the camera. For example, a DSLR typically receives meta information identifying the type and model of the lens. Also, camera settings such as focal length, aperture, and shutter speed may be sensed by a digital camera. Such sensor data may be transmitted as auxiliary data to an image processing server that takes into account the actual type of lens when processing the image raw data. For example lens correction algorithms which take into account the lens model can be applied when processing raw image data at the image processing server.

Accelerometer-based Processing of Raw Image Data

In addition or alternatively, sensor data obtained from an accelerometer which is integrated into a camera device may be used in enhancing the quality of a digitally processed picture. For example algorithms which perform blur reductions may benefit from information about the movement of a camera device at the moment when a picture was taken.

Location-based Processing of Raw Image Data

In addition or alternatively, raw image data uploaded to an image processing server may for example be compared to other image data or other images stored in a central database at the image processing server or in a database connected to the image processing server. When a degree of matching between a set of characteristics of an uploaded image and a corresponding set of characteristics of a stored image exceeds a predefined threshold, location information associated with said stored image may be used for tagging the digitally processed picture with location information.

The location-dependent information may be for example any subset of following information: local time, any type of local weather forecast, illustrative information or labels relating to one or more objects captured in the image (for example names of villages, mountains, rivers, brooks, mountain huts, bridges, railway stations, bus stops, passes, ski-lifts), a time-table of a public transport, a list of hotspots located near the user, a list of local radio channels, a list of points-of-interest, a map, an event calendar, an almanac of a positioning system (e.g. GPS, GLONASS, Galileo), or any other location-dependent information which may be of interest to a user or can be used in an App (software application) on the electronic device or on the smartphone.

Temperature-dependent Processing of Raw Image Data

In addition or alternatively, the image processing server may take into account an actual temperature of a portion of the electronic device at time of capturing raw image data. For example, certain optical features of the optics of the electronic device may be temperature-dependent. Hence, the image processing server may be employed to compensate temperature-dependency of a lens or electronic device optics at least partially.

Apart from this, the image processing server may take into account an actual temperature of another portion of the electronic device at time of capturing of raw image data. For example, certain optical features of an image sensor of the electronic device may be temperature-dependent. Hence, the image processing server may be employed for compensating temperature-dependency of an image sensor IS completely, or at least partially.

Device-setting-dependent Processing of Raw Image Data

In addition or alternatively, the image processing server may take into account user preferences. The user's preferences may be defined implicitly using side information as location, device type (for example camera type), personal details (like profession, age, gender) or explicitly using information about device settings or entries on an individual webpage.

\* \* \*

All devices and entities described in this specification and claimed in the appended claims can, if not stated otherwise, be implemented as integrated circuit logic, for example on a chip, and functionality provided by such devices and entities can, if not stated otherwise, be implemented by software.

It is thus disclosed in this specification:

(1) A method comprising:
  receiving, from an electronic device, raw image data generated by an image sensor of the electronic device, and auxiliary sensor data produced by an auxiliary sensor at the electronic device; and
  processing said raw image data to generate a digitally processed picture taking into account said auxiliary sensor data.

(2) The method of (1), wherein the receiving raw image data and auxiliary sensor data and the processing said raw image data to generate a digitally processed picture is performed by a remote image processing server, the method further comprising:
  generating, by said electronic device, raw image data using an image sensor;
  acquiring, by said electronic device, auxiliary sensor data from an auxiliary sensor; and
  transferring, by said electronic device, said raw image data and said auxiliary sensor data to the remote image processing server.

(3) The method of (1) or (2), wherein said auxiliary sensor data comprises at least one of audio data, electronic device settings, operational electronic device data, user data, positional data, movement data, temperature data, meteorological data, and radio data.

(4) The method of anyone of (1) to (3), wherein processing said raw image data to generate a digitally processed picture comprises performing an image manipulation based on said auxiliary sensor data.

(5) The method of anyone of (1) to (4), further comprising transmitting, by said remote image processing server, said digitally processed picture to the electronic device.

(6) The method of anyone of (1) to (5), wherein processing said raw image data to generate a digitally processed picture comprises a device-type-dependent processing of raw image data.

(7) The method of anyone of (1) to (5), wherein processing said raw image data to generate a digitally processed picture comprises an accelerometer-based processing of the raw image data.

(8) The method of anyone of (1) to (5), wherein processing said raw image data to generate a digitally processed picture comprises a location-based processing of raw image data.

(9) The method of anyone of (1) to (5), wherein processing said raw image data to generate a digitally processed picture comprises a temperature-dependent processing of raw image data.

(10) The method of anyone of (1) to (5), wherein processing said raw image data to generate a digitally processed picture comprises a device-setting-dependent processing of raw image data.

(11) An electronic device comprising:
  an image sensor for sensing an image and for generating raw image data representing said image;
  an auxiliary sensor for acquiring auxiliary sensor data; and
  a transmitter for transferring said raw image data and said auxiliary sensor data to a remote image processing server, wherein said remote image processing server is configured to process said raw image data to generate a digitally processed picture taking into account said auxiliary sensor data.

(12) A server comprising a processor which is configured to receive raw image data;
  receive auxiliary sensor data;
  process said raw image data to generate a digitally processed picture taking into account said auxiliary sensor data.

(13) A cloud server system which provides a cloud service for processing raw image data, the cloud server system comprising one or more servers as defined in (12).

The present application claims priority to European Patent Application 14 158 927.5, filed in the European Patent Office on Mar. 11, 2014, the entire contents of which being incorporated herein by reference.

The invention claimed is:

1. A method, comprising:
  generating, by an electronic device including an image sensor and an auxiliary sensor, raw image data according to readings from the image sensor;
  generating, by the electronic device, auxiliary sensor data according to readings from the auxiliary sensor;
  wirelessly transmitting, by the electronic device, the raw image data and the auxiliary sensor data to a local smart device, the local smart device forwarding the raw image data and the auxiliary sensor data to a remote image processing server;
  receiving, by the remote image processing server from the local smart device, the raw image data and the auxiliary sensor data; and
  processing, by the remote image processing server, the raw image data according to the auxiliary sensor data to generate a digitally processed picture.

2. The method of claim 1, wherein the auxiliary sensor data comprises at least one of audio data, electronic device settings, operational electronic device data, user data, positional data, movement data, temperature data, meteorological data, and radio data.

3. The method of claim 1, wherein in the processing, the remote image processing server processes the raw image data to generate the digitally processed picture by performing an image manipulation based on the auxiliary sensor data.

4. The method of claim 1, further comprising transmitting, by the remote image processing server, the digitally processed picture to the electronic device.

5. The method of claim 1, wherein the processing of the raw image data to generate the digitally processed picture comprises a device-type-dependent processing of the raw image data.

6. The method of claim 1, wherein the processing of the raw image data to generate the digitally processed picture comprises an accelerometer-based processing of the raw image data.

7. The method of claim 1, wherein the processing of the raw image data to generate the digitally processed picture comprises a location-based processing of the raw image data.

8. The method of claim 1, wherein the processing of the raw image data to generate the digitally processed picture comprises a temperature-dependent processing of the raw image data.

9. The method of claim 1, wherein the processing of the raw image data to generate the digitally processed picture comprises a device-setting-dependent processing of the raw image data.

10. An electronic device, comprising:
  an image sensor;
  an auxiliary sensor;
  a transmitter; and
  a processor configured to
    generate raw image data according to readings from the image sensor;
    generate auxiliary sensor data according to readings from the auxiliary sensor; and
    control the transmitter to wirelessly transmit the raw image data and the auxiliary sensor data to a local smart device, wherein
  the local smart device raw image data and the auxiliary sensor data to a remote image processing server,
  the remote image processing server receives the raw image data and the auxiliary sensor data from the local smart device, and
  the remote image processing server processes raw image data according to the auxiliary sensor data to generate a digitally processed picture.

11. The electronic device of claim 10, wherein the auxiliary sensor data comprises at least one of audio data, electronic device settings, operational electronic device data, user data, positional data, movement data, temperature data, meteorological data, and radio data.

12. The electronic device of claim 10, wherein the remote image processing server is configured to process the raw image data to generate the digitally processed picture by performing an image manipulation based on the auxiliary sensor data.

13. The electronic device of claim 10, wherein the remote image processing server is configured to transmit the digitally processed picture to the electronic device.

14. The electronic device of claim 10, wherein the remote image processing server is configured to process the raw image data to generate the digitally processed picture comprises a device-type-dependent processing of the raw image data.

15. The electronic device of claim 10, wherein the remote image processing server is configured to the raw image data to generate the digitally processed picture comprises an accelerometer-based processing of the raw image data.

16. The electronic device of claim 10, wherein the remote image processing server is configured to the raw image data to generate the digitally processed picture comprises a location-based processing of the raw image data.

17. The electronic device of claim 10, wherein the remote image processing server is configured to the raw image data to generate the digitally processed picture comprises a temperature-dependent processing of the raw image data.

18. A server, comprising:
  a processor configured to
    receive raw image data from a smart device, the raw image data having been generated by an electronic device according to readings from an image sensor of the electronic device and forwarded by the electronic device to the smart device;
    receive auxiliary sensor data from the smart device, the auxiliary sensor data having been generated by an electronic device according to readings from an auxiliary sensor of the electronic device and forwarded by the electronic device to the smart device; and process the raw image data according to the auxiliary sensor data to generate a digitally processed picture.

19. A cloud server system which provides a cloud service for processing raw image data, the cloud server system comprising:

one or more servers as claimed in claim 18.

20. The server of claim 18, wherein the auxiliary sensor data comprises at least one of audio data, electronic device settings, operational electronic device data, user data, positional data, movement data, temperature data, meteorological data, and radio data.

* * * * *